(12) United States Patent
Herre et al.

(10) Patent No.: US 7,181,079 B2
(45) Date of Patent: Feb. 20, 2007

(54) TIME SIGNAL ANALYSIS AND DERIVATION OF SCALE FACTORS

(75) Inventors: Juergen Herre, Buckenhof (DE); Martin Dietz, Nuremberg (DE); Thomas Sporer, Fuerth (DE); Michael Schug, Erlangen (DE); Wolfgang Schildbach, Seattle, WA (US)

(73) Assignee: Fraunhofer-Gesellschaft zur Foerderung der angewandten Forschung e.V (DE)

( * ) Notice: Subject to any disclaimer, the term of this patent is extended or adjusted under 35 U.S.C. 154(b) by 623 days.

(21) Appl. No.: 10/220,651

(22) PCT Filed: Feb. 16, 2001

(86) PCT No.: PCT/EP01/01748

§ 371 (c)(1),
(2), (4) Date: Nov. 13, 2002

(87) PCT Pub. No.: WO01/67773

PCT Pub. Date: Sep. 13, 2001

(65) Prior Publication Data

US 2005/0175252 A1    Aug. 11, 2005

(30) Foreign Application Priority Data

Mar. 6, 2000   (DE) .............................. 100 10 849

(51) Int. Cl.
G06K 9/36   (2006.01)
H04B 1/66   (2006.01)
H04N 7/12   (2006.01)
H04N 11/02  (2006.01)
H04N 11/04  (2006.01)
G10L 19/00  (2006.01)
G10L 21/00  (2006.01)

(52) U.S. Cl. .............. 382/251; 375/240.1; 375/240.29; 704/500

(58) Field of Classification Search ................. 382/251
See application file for complete search history.

(56) References Cited

U.S. PATENT DOCUMENTS 5,014,318 A    5/1991   Schott et al.

(Continued)

FOREIGN PATENT DOCUMENTS

DE    3805946 A1    2/1988

(Continued)

OTHER PUBLICATIONS

Kehyl, Michael; Herre, Jurgen; Schmidmer, Christian; NMR Measurements on Multiple Generations Audio Coding; Audio Engineering Society Preprint; Feb. 26, 1994.

(Continued)

*Primary Examiner*—Wenpeng Chen
*Assistant Examiner*—Yuzhen Ge
(74) *Attorney, Agent, or Firm*—Beyer Weaver LLP

(57) ABSTRACT

Analyzing an analysis time signal that has been generated from encoding and decoding and original time signal according to an encoding algorithm. The encoding block raster underlying the analysis time signal used by the encoding algorithm is determined. The analysis time signal is converted from its timely representation of analysis spectral coefficients to a spectral representation by using the established encoding block raster. At least two analysis spectral coefficients are grouped. The greatest common divisor of the analysis spectral coefficients are calculated, corresponding to the quantization step width used when quantizing the encoding algorithm or an integer multiple of it. In the case of an audio signal, the scale factor can easily be established for this group of spectral coefficients, i.e., for a scale factor band, from the quantization step width. All parameters used for the quantization of the original time signal are known; full iteration loops need not be performed.

12 Claims, 4 Drawing Sheets

U.S. PATENT DOCUMENTS

| | | | |
|---|---|---|---|
| 5,270,812 A | * | 12/1993 | Richards ................ 375/240.01 |
| 5,394,249 A | * | 2/1995 | Shimoda et al. ............ 386/124 |
| 6,064,698 A | * | 5/2000 | Koike ........................ 375/242 |
| 6,208,759 B1 | * | 3/2001 | Wells ........................ 382/232 |

FOREIGN PATENT DOCUMENTS

| | | |
|---|---|---|
| JP | 08 037643 | 2/1996 |
| WO | WO 99/04572 | 1/1999 |

OTHER PUBLICATIONS

Fletcher, John; ISO/MPEG Layer 2 Optimum re-encoding of decoded audio using a MOLE signal; BBC Research & Development.

Bosi et al.: ISO/IEC MPEG-2 Advanced Audio Coding.

Chen et al.: Extracting Coding Parameters From Pre-Coded MPEG-2 Video.

* cited by examiner

TIME SIGNAL ANALYSIS AND DERIVATION OF SCALE FACTORS

FIELD OF THE INVENTION

The present invention refers to the analysis of signals encoded and re-decoded in any way, and particularly to analyzing an analysis time signal comprising audio and/or video data generated by encoding and decoding of an original time signal according to an encoding algorithm.

BACKGROUND OF THE INVENTION AND PRIOR ART

It is generally known to encode audio and/or video signals by using a certain encoding method to obtain an encoded version of the original time signal, wherein the encoded version of the original time signal should differ basically from the original time signal in that the amount of data of the encoded signal is smaller than the amount of data of the original time signal. In such a case, the encoding algorithm for obtaining the encoded signal from the original signal and also the decoding algorithm that is essentially a reversal of the encoding algorithm referred to as a data reduced encoding algorithm.

Different encoding algorithms exists for data reduction of audio signals, which are subject of a series of international standards, wherein the encoding algorithm MPEG-2 AAC, for example, is described in detail in the international standard ISO/IEC 13818-7.

In the following, reference will be made to FIG. 8, which shows a block diagram of a MPEG audio encoding method. Such an audio encoder typically comprises an audio input 70, where a stream of time discrete samples is fed in, that are PCM samples, for example, that are 16 bit wide, for example. In an analysis filter bank 71, the stream of time discrete audio samples is divided into encoding blocks or frames of samples, windowed by using a respective window function and then converted into a spectral representation, for example by a filter bank or by a Fourier transform or a variation of the Fourier transform, such as a modified discrete cosine transform (MDCT). Thus, subsequent encoding blocks or frames of spectral coefficients are present at the output of the analysis filter bank 71, wherein a block of spectral coefficients is the spectrum of an encoding block of audio samples. Often, a 50% overlapping of subsequent encoding blocks is used, so that one window of, for example, 2048 audio samples is viewed per block, and by this processing 1024 new spectral coefficients will be generated.

The time discrete audio signal at input 70 will further be fed into a psychoacoustic model 72 to obtain a data reduction, such that, as is known, the masking threshold of the audio signal will be calculated depending on the frequency to perform a quantization of the spectral coefficients in a block 73 denoted with quantization and encoding, which depends on the masking threshold.

In other words, quantizing the spectral coefficients will be performed so coarsely, that the quantization noise introduced thereby lies below the psychoacoustic masking threshold, which is calculated by the psychoacoustic model 72, so that the quantization noise is ideally inaudible. This procedure causes that typically a certain number of spectral coefficients that are unequal to 0 at the output of the analysis filter bank 71 will be set to 0 after quantization, since the psychoacoustic model 72 has established that they will be masked by adjacent spectral coefficients and are therefore inaudible.

After quantizing a spectral representation of the encoding block of time discrete samples is present, wherein the quantization noise is, if possible, below the psychoacoustic masking threshold. These data reduced quantized spectral values can then be encoded without any loss, depending on the encoder that will be used, by using an entropy encoding, for example a Huffman encoding. Thereby, a stream of code words will be obtained, to which side information needed by a decoder will be added in a bit stream multiplexer 74, such as information regarding the analysis filter bank, information regarding the quantization, such as scale factors, or side information regarding further function blocks. Such further function blocks are in MPEG-2-AAC for example TNS processing, intensity stereo processing, center/side stereo processing or a prediction from spectrum to spectrum.

At an output 75 of the encoder, also referred to as bit stream output, the signal encoded according to the encoding algorithm shown in FIG. 8 will be present blockwise.

In the case of the decoder, the encoded signal will be fed into a bit stream input 80 of a decoder shown in FIG. 9, at the output 75 of the encoder shown in FIG. 8, which first carries out a bit stream demultiplex operation in a block 81 denoted as a bit stream demultiplexer, to separate the spectral data from the side information. At the output of block 81 then the code words will be present again, which represent the individual spectral coefficients. By using a respective table, the code words will be decoded to obtain quantized spectral values. These quantized spectral values will then be processed in a block 82 denoted with "inverse quantization" to recalculate the quantization introduced in block 73 (FIG. 8). At the output of block 82, dequantized spectral coefficients will be present, which will now be converted into the time domain via a synthesis filter bank 83, working inverse to a analysis filter bank 71 (FIG. 8), to obtain the decoded signal at an audio output 84.

When considering the encoding/decoding concept illustrated in FIGS. 8 and 9, it becomes clear that this is a block-oriented method, wherein the block generation is caused by the analysis filter bank block 71 of FIG. 8, and wherein the block forming will only be cancelled at the audio output 84 of the decoder shown in FIG. 9.

It further becomes clear, that this is a lossy encoding concept, since the decoded signal present the audio output 84 generally comprises less information than the original time signal present at the audio input 70. By the quantizer 73, controlled by the psychoacoustic model 72, information will be removed from the original time signal present at the audio input 70, which will not be added again in the decoder, but will be abandoned. Subjectively, this abandonment of information does, however, not lead to any quality losses in the ideal case, due to the psychoacoustic model 72 that is adapted to the human hearing properties, but merely to a wanted data compression.

Here, it should be noted, that the encoding concept described in FIG. 8 and FIG. 9 with the example of an audio signal, will be used correspondingly for image or video signals, wherein instead of the timely audio signal a video signal is present, wherein the spectral representation is no audio-frequency spectrum, but a location spectrum. Otherwise, an analysis filter bank or transform, respectively, a psycho optic model, a thereby controlled quantization and entropy encoding also take place in the video signal compression, wherein the whole encoding/decoding concept also runs blockwise.

The decoded signal (in the example of FIG. 9 the decoded audio signal at the audio output 84) is typically again a stream of time discrete samples based on an encoding block raster that is, however, generally, not visible in the decoded signal, except when special measures are taken.

While the process of the decoding is the normal case in the application, namely the transmission and storage of audio and/or image signals, there are, however, cases where it is of interest to "retranslate" a given decoded signal into a bit stream representation. This is especially of interest in the following cases, when only the decoded signal is available.

On the one hand, there is often a need to examine encoding systems with reference to the signals, which are encoded and re-decoded by them, for example to find out why a still unknown encoder sounds so well.

On the other hand, there is a need in the area of copyright protection to prove beyond doubt that a piece of music or an image has been encoded originally with a certain encoder.

Finally, there is a need in the area of transmission, for example via several networks, to encode a decoded signal again. In this case, the encoder/decoder concept shown in FIG. 8 and FIG. 9 is performed several times subsequently on an original audio time signal. There are problems in that so-called tandem encoding distortions of subsequent codec stages will be introduced.

In the specialist publication "NMR Measurements on Multiple Generations Audio Coding", Michael Keyhl, Jürgen Herre, Christian Schmidmer, 96. AES-Meeting, 26th Feb. to 1st Mar. 1994, Amsterdam, Preprint 3803, it is suggested to introduce an identification mark into a decoded signal for reducing the tandem encoding distortions, subsequent encoder stages being able to access this mark to perform its encoding block division of the signal to be encoded/decoded again based on this identification mark, such that all codec stages in a chain of codec stages use the same encoding block raster.

Although this method reduces the tandem encoding distortions significantly, it is still disadvantageous, in that the identification mark has to be introduced by a decoder and has to be extracted again and interpreted by a subsequent encoder. Therefore, changes both at a decoder and at an encoder are necessary. Further, this concept is of course only applicable for a tandem encoding of decoded signals having this identification mark for the encoding block raster. For signals that do not have this identification mark, a codec stage in a chain of codec stages can, of course, not access an identification mark.

Similar problems or restrictions of the flexibility occur also with the MOLE concept, described in "ISO/MPEG Layer 2—Optimum re-Encoding of Decoded Audio using a MOLE-Signal", John Fletcher, 104th AES-Convention, 16th to 19th May 1998, Preprint No. 4706. Generally, additional data describing in detail, in which way the present decoded audio signal has been encoded and decoded, are introduced into the decoded audio signal. These data are referred to as MOLE signal. When the decoded audio signal has to be re-encoded, a specially designed encoder will extract this MOLE signal from the signal to be encoded, and perform the individual encoding steps based on this signal.

Similar to the concept of the identification mark, there is also a disadvantage that the decoder decoding an originally encoded time signal for the first time has to introduce the signal into the decoded audio signal. Such a decoder is thus different to common standard decoders. Further, an encoder re-encoding a decoded signal will have to extract the determination signal in order to work correspondingly. This so-called second encoder also has to be modified such that it can read and interpret the determination signal. Finally, disadvantageously, this concept is also only applicable for decoded signals having such a determination signal, but not for signals that do not have such a determination signal.

For the quantization (block 73 in FIG. 8), a significant effort is made in the calculation of scale factors, for example by lying the quantization noise introduced by quantization in a psychoacoustic encoder below the psychoacoustic masking threshold of the audio signal at the audio input 70. Thereby, it has to be taken into consideration at the same time that a certain bit stream rate can be necessary at the output. Finally, there is also the general aim to compress the audio signal as strongly as possible, essentially without deterioration of the audio quality.

In the international standard MPEG-2 AAC that has already been mentioned in the beginning, one possible quantization method is described in paragraph B.2.7, wherein an expensive iterative method with an outer iteration loop and an inner iteration loop is used to calculate optimum scale factors for each scale factor band and thus the optimum quantization step width for all three conditions.

Thus, calculating the iteration loops for determining the quantization step width takes up a significant part of the computing effort when encoding an audio signal.

When, for example, in the case of tandem encoding, a signal has been encoded and re-decoded, and will be re-encoded, normally the full quantization has to be calculated again by using the psychoacoustic model, the inner iteration loop and the outer iteration loop, even when the encoding block raster underlying the signal to be processed is known. This is in so far unsatisfactory, since the quantization parameters have already been calculated in the earlier encoding of the original time signal. There are, however, no explicit references in the re-decoded signal that can be used in a further encoding in order to do without the expensive calculation of scale factors and thus the quantization step width.

SUMMARY OF THE INVENTION

It is the object of the present invention to provide an apparatus and a method for analyzing an analysis signal.

In accordance with a first aspect of the present invention, this object is achieved by an apparatus for analyzing a spectral representation of an analysis signal comprising audio and/or video data that has been generated by encoding and decoding of an original signal according to an encoding algorithm, wherein the encoding algorithm has a quantization step, wherein the quantization step serves to quantize at least part of original spectral coefficients or of spectral coefficients derived from the original spectral coefficients of a spectral representation of the original signal by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising: means for grouping analysis spectral coefficients or spectral coefficients derived from the analysis spectral coefficients of the spectral representation of the analysis signal in scale factor bands; means for at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it; and means for calculating the scale factor for the scale factor band by evaluating the predetermined relation between the encoding amplification factor and the scale factor dissolved after the scale factor, wherein the calculated greatest common divisor is inserted in the predetermined relation instead of the encoding amplification factor.

In accordance with a second aspect of the present invention, this object is achieved by a method for analyzing a spectral representation of an analysis signal comprising audio and/or video data that has been generated by encoding and decoding an original signal according to an encoding algorithm, wherein the encoding algorithm has a quantization step, wherein the quantization step serves to quantize at least part of the original spectral coefficients or spectral coefficients derived from the original spectral coefficients of the spectral representation of the original signal by using a quantization step width, wherein the quantization step of the encoding algorithm comprises grouping the original spectral coefficients into scale factor bands, wherein a scale factor is associated to each scale factor band, wherein the quantization step further comprises weighting the original spectral coefficients in a scale factor band with an encoding amplification factor, wherein the encoding amplification factor is in a predetermined relation to a scale factor for the scale factor band, comprising: grouping of analysis spectral coefficients or spectral coefficients derived from the analysis spectral coefficients of the spectral representation of the analysis signals into scale factor bands; at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it; and calculating the scale factor for the scale factor band by evaluating the predetermined relation between the encoding amplification factor and the scale factor dissolved after the scale factor, wherein the calculated greatest common divisor is inserted into the predetermined relation instead of the encoding amplification factor.

It is another object of the present invention to provide an apparatus and a method for marking and/or encoding an analysis signal working by using information obtained by the analysis.

In accordance with a third aspect of the present invention, this object is achieved by an apparatus for marking an analysis time signal, comprising audio and/or video data that has been generated by encoding and decoding an original time signal according to an encoding algorithm, wherein the encoding algorithm has a conversion step and a quantization step, wherein the conversion step serves to generate a spectral representation of the original time signal comprising original spectral coefficients by using an encoding block raster, and wherein the quantization step serves to quantize at least part of the original spectral coefficients or the spectral coefficients derived from the original spectral coefficients by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising: means for analyzing the analysis time signal, comprising: means for establishing the encoding block raster underlying the analysis time signal; means for converting the analysis time signal into a spectral representation of the analysis time signal by using the established encoding block raster, wherein the spectral representation of the analysis time signal comprises analysis spectral coefficients; means for grouping of analysis spectral coefficients or spectral coefficients derived from the analysis spectral coefficients; and means for at least approximately calculating the greatest common divisor of the grouped analysis spectral coefficients or the spectral coefficients derived from the analysis spectral coefficients in a scale factor band to obtain the quantization step width used in the quantization step for the analysis spectral coefficients or for the analysis spectral coefficients derived from the analysis spectral coefficients or an integer multiple of it; and means for calculating the scale factor for the scale factor band by evaluating the predetermined relation between the encoding amplification factor and the scale factor, dissolved after the scale factor wherein the calculated greatest common divisor is inserted into the predetermined relation instead of the encoding amplification factor; means for assigning information to the analysis time signal regarding the scale factors that have been used when quantizing the original time signal on which the analysis time signal is based.

In accordance with a fourth aspect of the present invention, this object is achieved by an apparatus for encoding an analysis time signal comprising audio and/or video data that has been generated by encoding and decoding an original time signal according to an encoding algorithm, wherein the encoding algorithm has a conversion step and a quantization step, wherein the conversion step serves to generate a spectral representation of the original time signal comprising original spectral coefficients by using an encoding block raster, and wherein the quantization step serves to quantize at least part of the original spectral coefficients or the spectral coefficients derived from the original spectral coefficients by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising: means for establishing the encoding block raster underlying the analysis time signal; means for converting the analysis time signal into a spectral representation of the analysis time signal by using the established encoding block raster, wherein the spectral representation of the analysis time signal comprises analysis spectral coefficients; means for grouping of analysis spectral coefficients or spectral coefficients derived from the analysis spectral coefficients in scale factor bands; and means for at least approximately calculating the greatest common divisor of the grouped analysis spectral coefficients or the spectral coefficients derived from the analysis spectral coefficients in a scale factor band to obtain the quantization step width used in the quantization step for the analysis spectral coefficients or for the analysis spectral coefficients derived from the analysis spectral coefficients or an integer multiple of it; and means for calculating the scale factor for the scale factor band by evaluating the predetermined relation between the encoding amplification factor and the scale factor dissolved after the scale factor, wherein the calculated greatest common divisor is inserted into the predetermined relation instead of the encoding amplification factor, and means for quantizing the analysis spectral coefficients or the spectral coefficients derived from the analysis spectral coefficients by using the scale factors determined for each spectral coefficient to obtain an encoded analysis time signal.

In accordance with a fifth aspect of the present invention, this object is achieved by a method for marking an analysis time signal comprising audio and/or video data that has been generated by encoding and decoding an original time signal, wherein the encoding algorithm comprises a conversion step and a quantization step, wherein the conversion step serves to generate a spectral representation of the original time signal comprising original spectral coefficients by using an encoding block raster, and wherein the quantization step serves to quantize at least part of the original spectral coefficients or spectral coefficients derived from the original spectral coefficients by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising: analyzing the analysis time signal with the following sub-steps: establishing the encoding block raster underlying the analysis time signal; converting the analysis time signal into a spectral representation of the analysis time signal by using the established encoding block raster, wherein the spectral representation of the analysis time signal comprises analysis spectral coefficients; grouping of analysis spectral coefficients or spectral coefficients derived from the analysis spectral coefficients into scale factor bands; at least approximately calculating the greatest common divisor of the grouped analysis spectral coefficients or the spectral coefficients derived from the analysis spectral coefficients in a scale factor band to obtain the quantization step width used in the quantization step for the analysis spectral coefficients or for the analysis spectral coefficients derived from the analysis spectral coefficients or an integer multiple of it; and calculating the scale factor for the scale factor band by evaluating the predetermined relation between the encoding amplification factor and the scale factor, dissolved after the scale factor wherein the calculated greatest common divisor is inserted into the predetermined relation instead of the encoding amplification factor; assigning information to the analysis time signal concerning the scale factors used in quantizing the original time signal on which the analysis time signal is based.

In accordance with a sixth aspect of the present invention, this object is achieved by a method for encoding an analysis time signal comprising audio and/or video data that has been generated by encoding and decoding an original time signal according to an encoding algorithm, wherein the encoding algorithm has a conversion step and a quantization step, wherein the conversion step serves to generate a spectral representation of the original time signal comprising original spectral coefficients by using an encoding block raster, wherein the quantization step serves to quantize at least part of the original spectral coefficients or spectral coefficients derived from the original spectral coefficients by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising: establishing the encoding block raster underlying the analysis time signal; converting the analysis time signal into a spectral representation of the analysis time signal by using the established encoding block raster, wherein the spectral representation of the analysis time signal comprises analysis spectral coefficients; grouping of analysis spectral coefficients or of spectral coefficients derived from the analysis spectral coefficients in scale factor bands; and at least approximately calculating the greatest common divisor of the grouped analysis spectral coefficients or the spectral coefficients derived from the analysis spectral coefficients in a scale factor band to obtain the quantization step width used in the quantization step for the analysis spectral coefficients or for the analysis spectral coefficients derived from the analysis spectral coefficients or an integer multiple of it; calculating the scale factor for the scale factor band by evaluating the predetermined relation between the encoding amplification factor and the scale factor, dissolved after the scale factor, wherein the calculated greatest common divisor is inserted into the predetermined relation instead of the encoding amplification factor; and quantizing the analysis spectral coefficients or the spectral coefficients derived from the analysis spectral coefficients by using the quantization step width determined for each spectral coefficient to obtain an encoded analysis time signal.

The present invention is based on the finding that an analysis time signal generated by encoding and decoding an original time signal according to an encoding algorithm or, if already present, a spectral representation of any analysis signal, does not have any explicit information about the used quantization, but due to the fact that quantization is a form of lossy encoding still has influences regarding the parameters that have originally been quantized.

In audio signals, the values, which are normally quantized, are the spectral coefficients generated by transforming the audio signal from a timely representation into a spectral representation. Analogous, in video signals, the values that are quantized are the location spectral coefficients, which mean also coefficients that can be generated by converting a timely representation of the video signal into a spectral representation of the video signal.

Thus, according to the invention, for analyzing the quantization underlying the analysis time signal, the encoding block raster underlying the analysis time signal will be determined at first. This encoding block raster is the block raster used in encoding the original time signal according to the encoding algorithm. After that, the analysis time signal will be converted into a spectral representation by using the determined encoding block raster to obtain the coefficients, which have been quantized according to the encoding algorithm. It is best to use the same parameters for the conversion as in the underlying conversion step. If, however, the analysis signal is already present as a spectral representation, i.e. a plurality of analysis spectral coefficients of any signal, the steps of determining the encoding block raster and converting when determining the quantization step width can omitted.

Now the analysis spectral coefficients will be grouped to obtain a group of at least two analysis spectral coefficients. Inventively, the greatest common divisor will now be calculated, at least approximately, from these two analysis spectral coefficients. The greatest common divisor of the two analysis spectral coefficients corresponds already to the quantization step width or an integer multiple of the quantization step width. If the at least two grouped analysis spectral coefficients differ, for example, by only one quantization step width, then the quantization step width can already be calculated directly from merely two analysis spectral coefficients. Her, the quantization step width is immediately equal to the greatest common divisor of the two analysis spectral coefficients.

If the greatest common divisor is calculated from more than two analysis spectral coefficients the probability, that spectral coefficients are taken into consideration in calculating the greatest common divisor that are in a corresponding relationship to one another, is increasing. Then, the greatest common divisor of these spectral coefficients will not only be an integer multiple of the quantization step width, but correspond directly to the quantization step width.

When the quantization step width is known, the scale factors used in encoding can be established—in the example of an audio encoder—by taking into consideration the relation between scale factor and encoding amplification factor.

Even a non-uniform quantizer "compressing" larger values before rounding, can be analyzed easily, when the compression characteristic curve is applied to the analysis spectral coefficients to generate spectral coefficients derived from the analysis spectral coefficients. From these compressed spectral coefficients the greatest common divisor can be determined.

If, in the case of a modern audio encoding method, such as MPEG-2 Layer 3 or MPEG-2 AAC, scale factors are used in quantization for individual scale factor bands, these scale factors can be calculated from the greatest common divisor of the spectral coefficients of the respective scale factor band. Further, by evaluating the different scale factors—they all have to be in an integer raster—a total scaling of the audio signal can be determined.

If, however, individual scale factors deviate from the integer raster, the actual quantization step width can be calculated afterwards in the individual scale factor bands. This is the case, when the operation of forming the greatest common divisor has not provided the actual quantization step widths but integer multiples of them.

The inventive method is advantageous in that a quantization can be established totally without explicit quantization information in the encoded and re-decoded signal. Thereby, any encoding systems and any quantization techniques of encoding systems, respectively, can be analyzed in order to find out why an encoder unknown as such has certain properties.

It is another advantage, that especially for forensic purposes and for investigations about the violation of copyright protection, encoding properties can be established via an encoded and re-decoded signal, to be able to draw the conclusion that a piece of music has been encoded with a certain encoder. Depending on the initial situation, it can then be established, whether this encoder has been authorized or whether this is a case of audio and/or video piracy.

It is another advantage of the inventive concept that any encoded/decoded signals that are already present on diverse data banks can be analysed, in order to add information to them regarding the quantization used in the encoder. This information can then be used by another encoder in the case of tandem encoding, to enable any number of repetitions of encoding/decoding operation with no or minimum tandem encoding distortions. This corresponds to the above-mentioned MOLE concept, wherein a MOLE signal can also be used to carry out any number of tandem encodings.

It is another advantage of the inventive method that it can be used directly to perform a quantization of the audio signal by using the established quantization information, since the analysis spectral coefficients or spectral coefficients derived there from, respectively, are already present. Therefore, a full encoding according to a certain encoding standard becomes possible, without having to calculate a psychoacoustic model and the iteration loops necessary for quantization, respectively. Thus, all quantization information "hidden" in the encoded and re-decoded analysis time signal can be extracted to obtain a new decoding with as little effort as possible.

BRIEF DESCRIPTION OF THE DRAWINGS

Preferred embodiments of the present invention will be discussed in more detail below with reference to the accompanying drawings. They show.

DETAILED DESCRIPTION OF PREFERRED EMBODIMENTS

Figure 6:
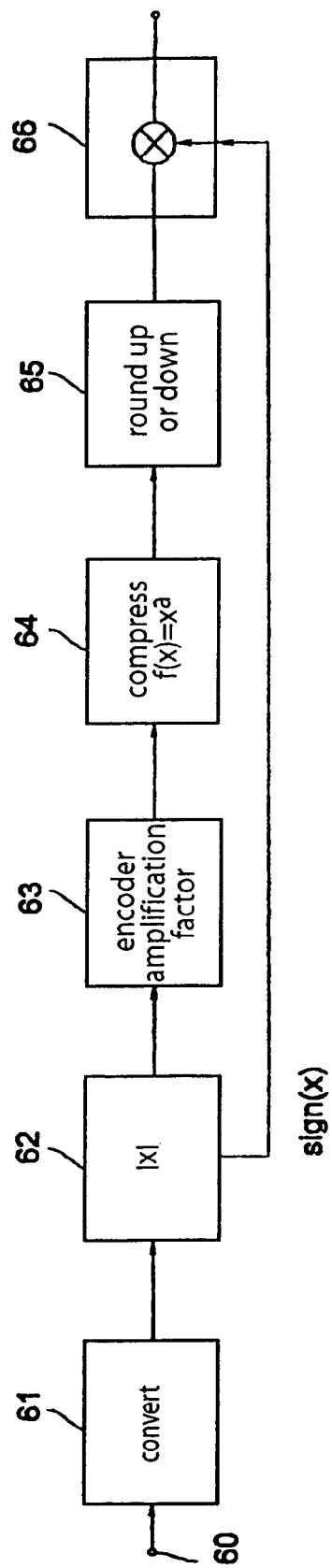
FIG. 6 a basic block diagram of a known encoder.

With reference to FIG. 6, a timely representation of an audio signal, for example, is fed into an input 60 of the encoding apparatus shown in FIG. 6. The audio signal will be converted from its timely representation into a spectral representation, for example via an analysis filter bank (61). The spectral representation of the audio signal consists of a plurality of spectral coefficients that cover the whole spectrum up to a maximum frequency, corresponding to the bandwidth of the audio signal. In a block 62, the absolute amount of each spectral coefficient x is formed, while the sign x (i.e. sign(x)), is output for another separate treatment. Thus, merely absolute amounts of spectral coefficients are present at the output of block 62. Thus, it is made sure that all subsequent computing operations and especially the compression operation indicated in a block 64 will be fed with defined, i.e. positive, input values.

In the example of the MPEG-2 AAC quantization each spectral coefficient in a block 63 will be applied with an encoder amplification factor derived from the scale factor according to the following equation:

$$x\_absw = x\_abs / ([2^{(0.25) \cdot (sf-SF\_OFFSET)}])\qquad (eq.\ 1)$$

In equation 1 the used variables have the following meaning:
x_absw: weighted spectral value at the output of block 63;
x_abs: absolute amount of a spectral value at the output of block 62;
sf: the scale factor to be transmitted for a scale factor band in the bit stream; and SF_OffST: a constant having the value 100 for MPEG-2 AAC, for example.

The amounts of the spectral coefficients weighted in that way will then be compressed in a block 64.

Therefore, a function $f(x)=x^a$ can be used, wherein in the case of compressing the coefficient a is smaller than 1. In other words, this means that smaller spectral coefficients will be reduced to less than large spectral coefficients. This compressing has been found to be favourable with audio signals. Analogous, a reversed function with a coefficient a larger than 1 could be used, such that higher spectral coefficients will be increased as opposed to smaller spectral coefficients. Such a function could be favourable for other signals than audio signals.

The actual quantization takes place in block 65 denoted with round up or round down. The function of the two blocks 64 and 65 can be illustrated in an equation as follows:

$$x\_quant = \text{sign}(x) \cdot \text{nint}[x\_absw^a + \text{const}] \quad \text{(eq. 2)}$$

In equation 2, the used symbols have the following meaning:

x_quant: the quantized spectral coefficients at the output of block 65;

a: the compression parameter of block 64;

const: an additive constant that is preferably kept small; and nint: the function "nearest integer", that causes the rounding up and rounding down in block 65, respectively.

By the function nint[y], a value y is generally rounded up or down, respectively, to the nearest integer. If y has the value 1.2, for example, then nint[y] has the value 1. If y, however, has the value 1.6, then the function nint[y] yields the integer 2. Thus, by the function nint[y], a continuous set of values is mapped to a discrete set of values. In other words, a continuous function becomes a staircase function.

Thus, the total quantization step width corresponds to the product of the encoder amplification factor and the "distance" from 1 integer to the next integer. If rounding between one integer and the next higher integer takes place, the total quantization step width is equal to the encoder amplification factor, since the distance between the integers has the value of 1. Naturally, any quantization functions can be used, which, for example, perform no rounding up or down to the next integer, but to the next integer after that, for example.

By a block 66, connected to block 62, the quantized spectral coefficients are provided with their sign again for further processing, to obtain sign information from block 62.

Further, in equation 2, the function sign(x) is listed, which means that the quantized spectral coefficients are signed again at the output of block 66.

Figure 7:
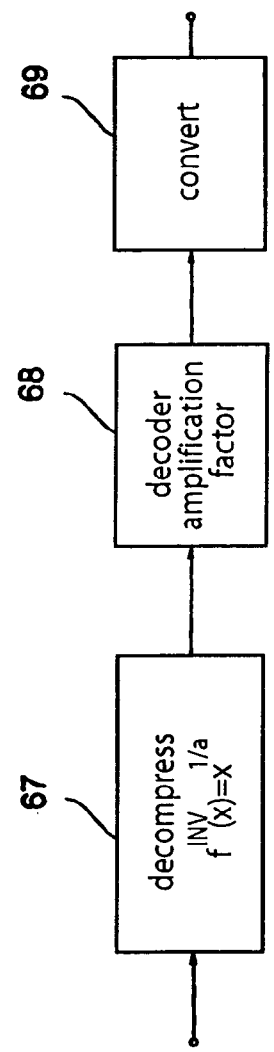
FIG. 7 a basic block diagram of a known decoder.

In FIG. 7, the case is considered, where the signs of the individual spectral coefficients are not transmitted together with the quantized spectral coefficients but supplied separately to a block 66, which adds its sign to each absolute amount of a spectral coefficient. The signed quantized spectral coefficients will then be decompressed in a block 67, i.e. undergo an operation inverse to the operation in compressing 64 in FIG. 6.

In an equation, the function of blocks 66 and 67 can be illustrated as follows:

$$x\_invquant = \text{sign}(x\_quant) \cdot |x\_quant|^{(1/a)} \quad \text{(eq. 3)}$$

In equation 3, the variable x_invquant means a decompressed spectral coefficient. This decompressed spectral coefficient will then be weighted with a decoder amplification factor in block 68, which corresponds to the encoder amplification factor. This can be expressed by the following equation:

$$x\_recon = x\_invquant \cdot [2^{(0.25 \cdot (sf - SF\_OFFSET))}] \quad \text{(eq. 4)}$$

From a comparison of equation 1 with equation 4 it becomes clear that the same decoder amplification factor is used for multiplying in equation 4 as for the division in equation 1.

When the spectral coefficients present at output 68 have been converted from their spectral representation to their timely representation again by a block 69, an encoded and re-decoded signal is present, which will subsequently also be referred to as analysis time signal. The establishing of the quantization underlying this signal will be explained below.

Before this will be dealt with in more detail, it should be noted here that in an encoding with a uniform quantization, e.g. MPEG-1 layer 2, the calculation of the power function will be omitted. In the terminology of FIGS. 6 and 7, this would correspond to a parameter a.

In summary, it can be stated that in FIGS. 6 and 7, an encoding/decoding system based on an encoding algorithm having a conversion step for generating a spectral representation of a signal (block 61) and a quantization step for quantization spectral coefficients (block 65) is illustrated. If intermediate processing steps are performed, such as in block 62, 63 and 64, not the spectral coefficients formed by conversion will be quantized, but the spectral coefficients derived there from.

At the same time, the encoding algorithm determines the decoding steps reversed for encoding of decompressing (block 67), providing with a decoder amplification factor (block 68), and the reverse conversion from a spectral representation into a timely representation (block 69). It should be noted that the decoder shown in FIG. 7—although not shown in FIG. 7—has also means for removing the sign of the quantized spectral coefficients before block 67 and means for adding the sign after block 67, analogous to FIG. 6.

In the following, reference will be made to FIG. 1, to describe an inventive apparatus for analyzing an analysis signal in form of an analysis time signal or any signal. It should be noted that no detailed representation will be given of the case, where already a somehow obtained spectral representation of the analysis signal is present. This case, however, results automatically from the following description by omitting the steps of determining the encoding block raster and converting from a timely representation into a spectral representation.

Figure 1:
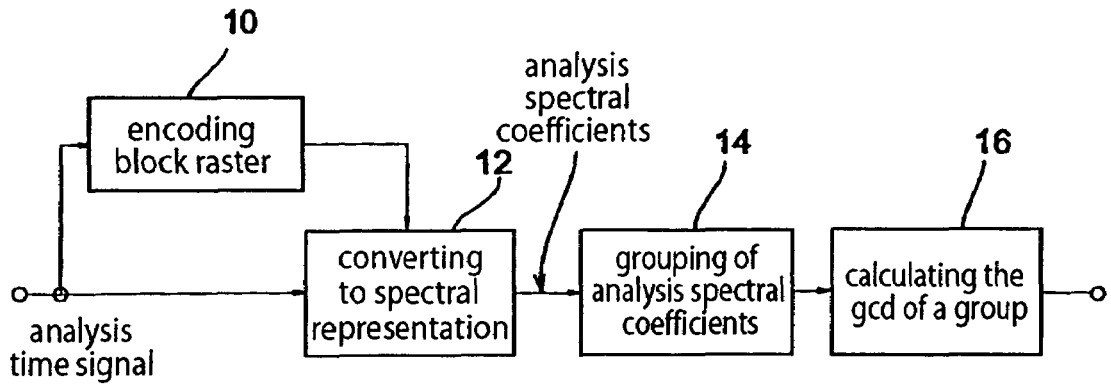
FIG. 1 a basic block diagram of an inventive apparatus for analyzing.

An analysis time signal at the input of the block diagram shown in FIG. 1 is generated by encoding an original time signal via an encoder that is illustrated in FIG. 6, for example, and by decoding the encoded time signal output by the encoder via a decoder that is illustrated in FIG. 7, for example.

When the encoder of FIG. 6 and the decoder of FIG. 7 work optimally, the subjective auditory sensation of the original time signal and the analysis time signal will be identical at the output of the decoder, with the example of an audio signal. This requires, however, that the data reduction introduced by quantization has merely consequences below the psychoacoustic masking threshold and is thus inaudible. In other words, this means that the quantization noise introduced by quantization of block 65 (FIG. 6) has a lower energy than preset by the psychoacoustic masking threshold.

Although this subjective auditory sensation is clear in the case of an optimum encoder/decoder, the original time signal and the analysis time signal to be analyzed differ in that the analysis time signal is based on quantized spectral coefficients, in contrary to the original time signal.

Inventively, as is shown in FIG. 1, the encoding block raster used in the conversion step 61 of FIG. 6 will be determined (block 10). The information about the encoding block raster 10 will be used to perform a blockwise conversion of the analysis time signal from its timely representation to its spectral representation (block 12). At the output of block 12, analysis spectral coefficients will be present. The analysis spectral coefficients will now be grouped (block 14), such that one group of at least two analysis spectral coefficients will be present. In a block 16, the greatest common divisor of this group will be calculated within the scope of the accuracy of calculation, at least approximately. The greatest common divisor will then correspond to the quantization step width, which corresponds to the spectral values belonging to the considered group.

Here, it should be noted that the term "greatest common divisor" has to be seen in a generalized sense. The greatest common divisor does not necessarily have to be an integer but can be any real number. This can be illustrated with the following example. If a spectral coefficient has the value 0.6, while the other spectral coefficient has the value 0.9, the greatest common divisor of these two spectral coefficients will be 0.3. In this example, the quantization step width is 0.3. The quantized first spectral coefficient has the value 2. The quantized second spectral coefficient has the value 3.

The spectral values of the group can be illustrated by multiplying an integer factor with the established quantization step width. Thereby, the integer factor corresponds to the quantized spectral value.

So far, the case was considered, where the greatest common divisor is already the quantization step width itself and not an integer multiple of it. No integer multiple of the quantization step width but the quantization step width (QSW) itself results when a spectral coefficient of the group is equal to twice the quantization step width and the other spectral coefficient of the group is equal to three times the quantization step width. These two spectral coefficients are also prime.

If however, spectral coefficients with the same size are grouped, then the greatest common divisor of these two spectral coefficients is of course again the spectral coefficient. The quantization step width would then be equal to the two spectral coefficients which would again be, however, an integer multiple of the actual quantization step width.

If, finally, two spectral coefficients are grouped, wherein one of them is equal to twice the quantization step width and the other is equal to four times the quantization step width, the greatest common divisor will not be the quantization step width itself but twice the quantization step width.

It should be noted that, in actual cases, significantly more spectral coefficients will be grouped to one group, so that the case where all spectral coefficients in this group have the same size or are such that the greatest common divisor of the spectral coefficient does not correspond to the actual quantization step width but to an integer multiple of the quantization step width, respectively, is extremely rare. The procedure in those cases, where this situation is given, will be explained later.

Figure 2:
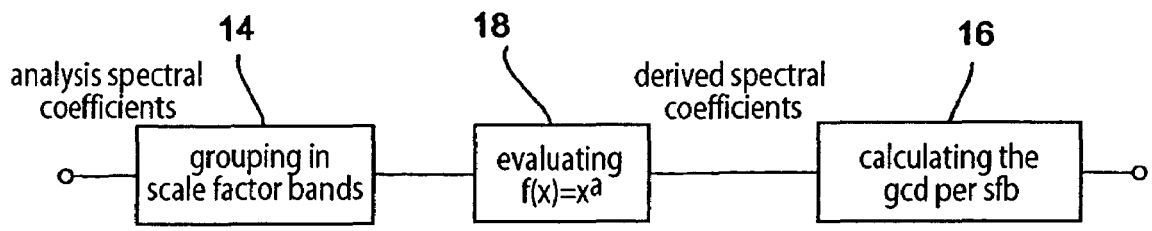
FIG. 2 an apparatus for analyzing with consideration of a non-uniform quantization step width.

With reference to FIG. 2, an extension of the concept shown in FIG. 1 will be described, such that a non-uniform quantizer will be used, as it has for example been described with reference to the encoder shown in FIG. 6. For consideration, an evaluation of the grouped analysis spectral coefficients will be carried out, which are preferably grouped into their scale factor bands in the example of an audio signal. The evaluation is illustrated in FIG. 2 by a block 18. It is identical to the compression described in block 64 of FIG. 6. Thereby, spectral coefficients derived from the analysis spectral coefficients that are grouped there will be formed, then the greatest common divisor per scale factor band will be calculated as in FIG. 1, to output the non-uniform quantized spectral values.

In FIG. 2, it can be seen that it does not matter, whether an evaluation is performed first and a grouping afterwards, or if, as is shown in FIG. 2, grouping comes first before evaluating.

Figure 3:
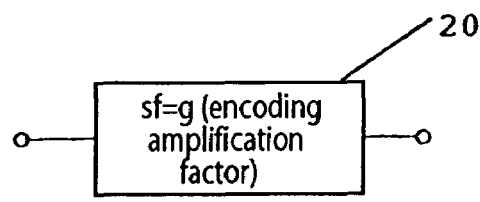
FIG. 3 an extension of the apparatus of FIG. 2 for calculating scale factors for scale factor bands.

FIG. 3 shows the case where not only a non-uniform quantization but also a scale factor bandwise amplification, for example via block 63 of FIG. 6, has been performed. The multiplication of a spectral coefficient with an amplification factor causes a modification of the quantization step width. If the spectral coefficients are weighted with a factor prior to rounding up or down, respectively, the quantization step width, with regard to the spectral coefficient before the multiplication, will be made larger or made smaller with the amplification factor depending on whether the amplification factor is smaller or larger than 1.

As it has been illustrated with reference to FIG. 6, the scale factor, which is transmitted as side information to a decoded audio signal, does not immediately correspond to the amplification factor, but will be calculated from the amplification factor by the following equation.

$$sf = 1/0.25 \cdot \log_2 (q^{\wedge}(1/a)) + SF\_OFFSET \quad (eq. 5)$$

When block 20, shown in FIG. 3, carries out the function of equation 5, the scale factor for this scale factor band can be calculated from the quantization step width underlying a scale factor band. The quantization step width corresponds to the greatest common divisor q or an integer fraction of it.

Therefore, finding out the scale factors comprises the step of calculating back the compression of the non-uniform quantization characteristic line (block 18 of FIG. 2) and the conversion of the quantization step width into the logarithmic resolution used in the encoder determined by the amplification factor. If the difference of (s−SF_OFFSET)=1, an amplification factor of $2^{-0.25}$ will result for the encoder and the decoder, respectively, which corresponds to a value of 1.5 dB.

The resulting scale factor values are ideally integers, within the scope of the accuracy of calculation. There are, however, the following exceptions.

If all values are offset by a constant amount, this will show a scaling of the analysis time signal by the respective factor. If, for example, a constant OFFSET results across all scale factors of 0.2, i.e. if the scale factors are for example 101.2, 102.2, 103.2, . . . , this will indicate an OFFSET of 0.2. As expected, the scale factors would have to be 101.0, 102.0, 103.0, . . . in the scope of the accuracy of calculation. An OFFSET of 0.2 corresponds to a scaling of 0.2·1.5 dB=0.3 dB. A total scaling of the analysis time signal could for example have been caused by an attenuation or amplification, respectively, of the output signal of the decoder shown in FIG. 7.

If individual certain scale factors differ from the integer raster, this has its reason in the described ambiguity with regard to obtaining the greatest common divisor of a group. As it has been explained, the greatest common divisor of a group can either be the quantization step width directly, or an integer multiple of the quantization step width.

If this case occurs, equation 5 will be carried out with a modified greatest common divisor q_mod=q/n, wherein the parameter n is an integer higher than 1. This iterative calculation of the scale factor will be performed until the resulting scale factor lies in the expected integer raster again. Accordingly, the "quantization step width" determined for this scale factor band will be modified. It will be divided by the factor established in the iteration where the integer scale factor raster has been achieved, to obtain the actual "base" quantization step width and not its integer multiple. This factor will further be used to correct the quantized values upwards by this factor.

Figure 4:
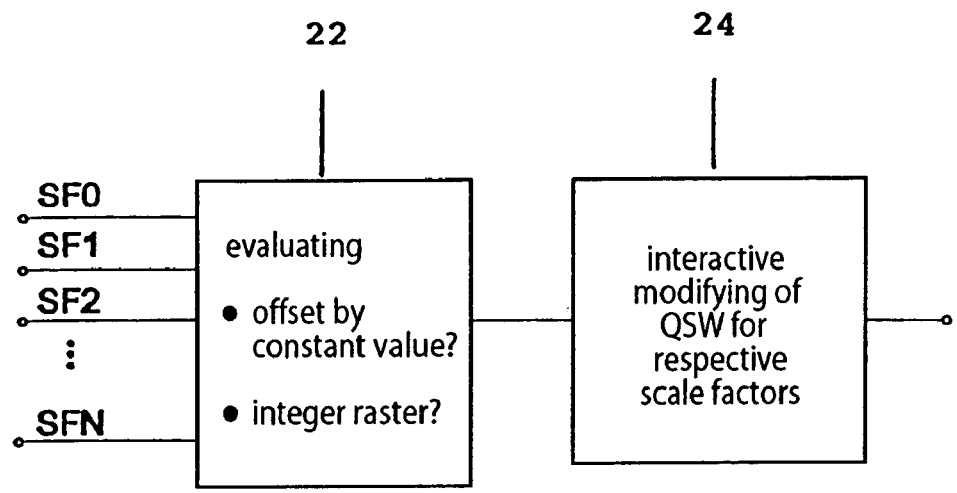
FIG. 4 an extension of the apparatus of FIG. 3 for evaluating the scale factors.

This evaluation of scale factors based on the fact that expected properties of the scale factors (such as the integer raster) are known, but not the actual scale factors, is illustrated schematically in FIG. 4 with a block 22 and a block 24. The block 22 for evaluating the scale factors obtains all scale factors SF 0, SF 1, SF 2, . . . , SF N of the scale factor bands with the indices 0, 1, 2, . . . , N, on the input side, in order to find out on the one hand, whether they are offset by a constant amount and/or to find out on the other hand, whether they are in an integer raster or not.

If they are no longer in the integer raster, the iterative modifying of the quantization step width by block 24 will be carried out for respective scale factors, to obtain modified scale factors and modified quantization step widths, respectively, for the corresponding groups.

Figure 5:
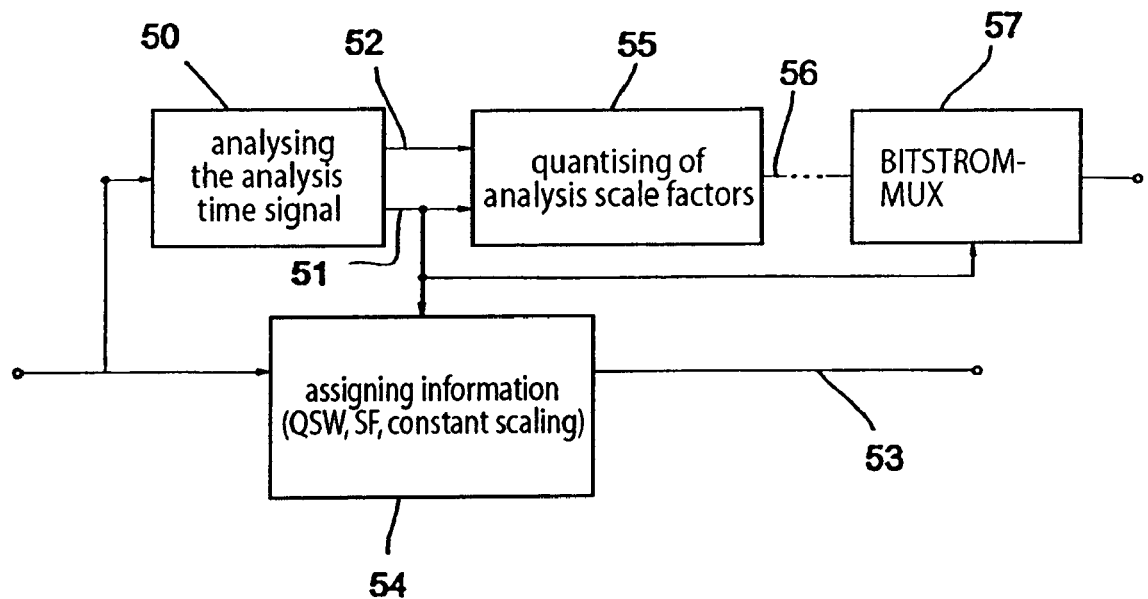
FIG. 5 a basic block diagram of an inventive apparatus for marking and/or encoding the analysis time signal.

FIG. 5 shows a block diagram of an inventive apparatus for marking an analysis time signal and for encoding an analysis time signal, respectively. This apparatus, which can either be used for marking or immediately for encoding the analysis time signal comprises means 50 for analyzing the analysis time signal constructed such as it has been illustrated with reference to FIG. 1 to 4. The output of means 50, as it has been described with reference to FIG. 1, consists basically of the quantization step width per group of analysis spectral coefficients. This output will be transmitted via a first output 51 of means 54, for assigning the information to the analysis time signal. The analysis time signal is at an output 53 of means 54, now, however, provided with information that enables a simple re-encoding of the analysis time signal. This information can particularly be the quantization step width, depending on the design of means 50, or, in the case of an audio signal encoded according to MPEG-2 AAC the scale factors for each scale factor band as well as the eventually present constant scaling that can be established by the concept described with reference to FIG. 4.

The information can be assigned to the analysis time signal in any known way, for example in a header portion of each and of only a few samples of the analysis time signal, respectively. This header portion will be defined by a transport channel for the samples of the analysis time signal, for example in the shape of additional fields either for each sample or for a group of samples. In principle, the same mechanism as in writing the MOLE signal can be used.

Means 50 for analyzing the analysis time signal can further be arranged to output the analysis spectral coefficients themselves via a second output 52. They will then be used together with the information about the quantization in means 55 for quantization the analysis spectral coefficients.

Means for quantization, illustrated by block 55 in FIG. 5 works such that it divides the analysis spectral coefficients of a group by the quantization step width determined for that group, to obtain the quantized analysis spectral coefficients again, which form the analysis signal present at an output 56 of the apparatus shown in FIG. 5. Means 55 preferably implements the same functionalities as illustrated in blocks 62 to 66 of FIG. 6. Now, the quantized analysis signal consists of the quantized spectral coefficients and can, as described with reference to FIG. 8, possibly be supplied to a bit stream multiplexer 57 after an entropy encoding. In the case of the described audio encoder example, the various side information, such as the scale factors, which are a measure for the used quantization step width in the individual scale factor bands, are supplied to the bit stream multiplexer 57 from output 51 of means 50.

Figure 8:
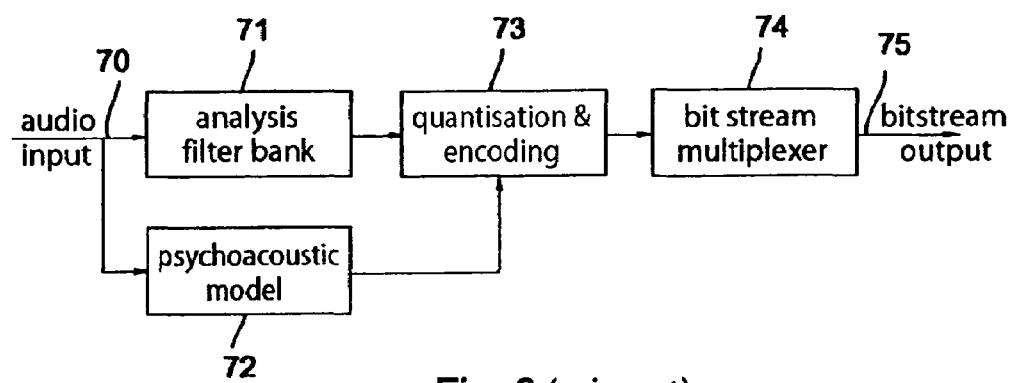
FIG. 8 a block diagram of an audio encoder.
Figure 9:
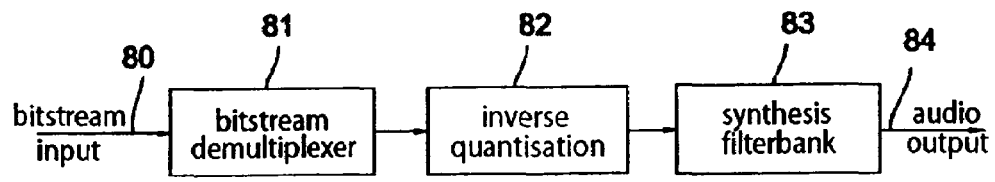
FIG. 9 a block diagram of an audio decoder.

The quantized spectral coefficients of the analysis signal can then, as it has been described with reference to FIG. 8, be entropy encoded and finally supplied to a bit stream multiplexer to then be stored or re-decoded again, for example.

It should be noted, that an encoding block raster is established practically by chance by the block-oriented encoder that is, for example, designed as in FIG. 6. This encoding block raster, however, has an influence on the spectral representation of the signal. Minimum deviations or encoding block raster offsets can already lead to the fact that the spectral representation of the decoded signal has a totally different appearance as would actually be expected from a spectral representation of the decoded signal, when it is based on the same encoding block raster than the decoded signal in general.

In the following, several possibilities for determining the encoding block raster (block 10 of FIG. 1) will be discussed. The encoding block raster can simply be determined with the mark, for example in the case of providing a mark in the analysis time signal.

Alternatively, the encoding block raster can also be established without existing information. Therefore, a portion with a determined number of time discrete samples will be singled out from the analysis time signal present as a sequence of time discrete samples, wherein the first sample of the singled out portion is referred to as output sample. Afterwards, the taken portion with the predetermined number of time discrete samples will be converted from its timely representation to a spectral representation. Then, the spectral representation of the portion will be evaluated with regard to a predetermined criterion, to obtain an evaluation result for the portion. If the evaluation result already corresponds to the predetermined criterion, the correct encoding block raster has been found by chance. However, if this is not the case, an iterative determination is carried out, by singling out a plurality of portions of the decoded signal beginning at different output samples, and converting and evaluating them. Thus, a plurality of evaluation results will be obtained.

Finally, the evaluation results will be searched to find out an evaluation result corresponding best to the predetermined criterion. This method is described in more detail in the patent application filed on Jan. 12, 2000, with the title "Device and Method for determining a coding block raster of a decoded signal".

In data reducing encoding algorithms that are always present when a quantization is carried out, and that are especially present when psychoacoustic models or psychooptical models are used, it is known from the start that a certain number of spectral coefficients are either set to zero due to a present quantization step width, or are also set to zero due to a psychoacoustic or psychooptic model. Therefore, if a spectral representation of an analysis time signal is obtained, where the spectrum has a relatively "smeared" look, i.e. where thus no determined number of spectral coefficients is equal to zero, it will be assumed, that the underlying encoding block raster does not correspond to the original block raster.

The evaluation criterion, for example consisting of a determined number of spectral coefficients being equal to zero, is therefore clearly no longer fulfilled, already when one sample deviates from original encoding block rasters. By combining the above-described method for determining the encoding block raster and the method for determining the quantization step width, a full analysis of an encoding underlying an analysis time signal can be achieved.

It should be noted here, that the inventive method can also be used with encoding methods that are constructed in a simpler way, such as ISO/MPEG-1/2 layer 1 or layer 2 or the dolby method AC-3. These methods differ from the embodiments described herein in the following aspects, among others.

A uniform quantization is used, i.e. the function $f(x)=x^a$ degenerates to $f(x)=x$ and $a=1$, respectively. Accordingly, in the quantization, no signs will have to be separated and introduced again.

The term "scale factor" is used differently. While in MPEG-2 layer 3 and MPEG-2 AAC the quantized spectral coefficient and the scale factor determine the quantization step width together, in MPEG-1/2 layer 1 or layer 2 as well as in dolby AC-3, some sort of floating-point representation with a mantissa between −1 and +1 and an exponent for the spectral coefficient will be used. Thereby, the exponent corresponds to the scale factor and the size in bits of the mantissa to the so-called bit allocation information (BAL information). When the quantizer step width is known, the scale factors and the BAL information can be calculated back.

Finally, in the so-called simpler methods, no entropy encoding will be performed.

The invention claimed is:

1. Apparatus for analyzing a spectral representation of an analysis signal comprising audio and/or video data that has been generated by encoding and decoding an original signal according to an encoding algorithm, wherein the encoding algorithm has a quantization step, wherein the quantization step serves to quantize at least part of original spectral coefficients or spectral coefficients derived from the original spectral coefficients of a spectral representation of the original signal by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising:
   a grouper for grouping analysis spectral coefficients or spectral coefficients derived from the analysis spectral coefficients of the spectral representation of the analysis signal in scale factor bands;
   a greatest common divisor calculator for at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it;
   a scale factor calculator for calculating the scale factor for the scale factor band by evaluating the predetermined relation between the encoding amplification factor and the scale factor, wherein the calculated greatest common divisor is used in the predetermined relation instead of the encoding amplification factor; and
   a scale factor evaluator for evaluating the calculated scale factors, wherein in the case where all scale factors deviate from an integer raster by a constant amount, a total scaling of the analysis time signal to the original time signal by a factor corresponding to the amount is established.

2. Apparatus according to claim 1, wherein the analysis signal goes back to an original analysis time signal, wherein the encoding algorithm further comprises a conversion step before the quantization step, wherein the conversion step serves to generate a spectral representation of the original time signal comprising original spectral coefficients, by using an encoding block raster, the apparatus further comprising:
   a block raster establisher for establishing the encoding block raster underlying the analysis time signal;
   a convener for converting the analysis time signal into a spectral representation of the analysis time signal by using the established encoding block raster, wherein the spectral representation of the analysis time signal comprises the analysis spectral coefficients.

3. Apparatus according to claim 1, wherein the quantization step of the encoding algorithm comprises evaluating the original spectral coefficients with an evaluation specification to generate the spectral coefficients derived from the original spectral coefficients, the apparatus further comprising:
   a spectral coefficients evaluator for evaluating the analysis spectral coefficients with the evaluation specification, to obtain the spectral coefficients derived from the analysis spectral coefficients.

4. Apparatus according to claim 3, wherein the evaluation specification of the spectral coefficients evaluator is a function $f(x)=x^a$, wherein a is smaller than 1.

5. Apparatus according to claim 1, further comprising:
   a scale factor evaluator for evaluating calculated scale factors for each scale factor band, wherein in the case of a scale factor deviating from an integer raster the greatest common divisor underlying this scale factor is divided iteratively by a natural number greater or equal to two, to obtain a modified greatest common divisor, wherein the scale factor is calculated in each iteration step by using the modified greatest common divider, and wherein as many iteration steps are performed until all scale factors are present in an integer raster.

6. Apparatus according to claim 1, further comprising:
   a quantization step evaluator for evaluating the quantization step width for a plurality of groups of analysis spectral coefficients for a plurality of groups of analysis spectral coefficients or of spectral coefficients derived from the analysis spectral coefficients, wherein in the case of different quantization step width for the groups, the smallest quantization step width is determined as the quantization step width underlying the analysis time signal.

7. Apparatus for marking an analysis time signal comprising audio and/or video data that has been generated by encoding and decoding an original time signal according to an encoding algorithm, wherein the encoding algorithm comprises a conversion step and a quantization step, wherein the conversion step serves to generate a spectral representation of the original time signal comprising original spectral coefficients by using an encoding block raster, and wherein the quantization step serves to quantize at least part of the original spectral coefficients or spectral coefficients derived from the original spectral coefficients by using a quantization step width, wherein the quantization step of the encoding algorithm comprises grouping of the original spectral coefficients in scale factor bands, wherein a scale factor is associated to each scale factor band, and wherein the quantization step further comprises weighting the original spectral coefficients in a scale factor band with an encoding amplification factor, wherein the encoding amplification factor is in a predetermined relation to a scale factor for the scale factor band, comprising;

an analyzer for analyzing the analysis time signal, comprising:

a block raster establisher for establishing the encoding block raster underlying the analysis time signal;

a converter for converting the analysis time signal into a spectral representation of the analysis time signal by using the established encoding block raster, wherein the spectral representation of the analysis time signal comprises analysis spectral coefficients;

a grouper for grouping analysis spectral coefficients or spectral coefficients derived from the analysis spectral coefficients of the spectral representation of the analysis signal in the scale factor bands;

a greatest common divisor calculator for at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it; and a scale factor calculator for calculating the scale factor for the scale factor band by evaluating the predetermined relation between the encoding amplification factor and the scale factor, wherein the calculated greatest common divisor is used in the predetermined relation instead of the encoding amplification factor;

a scale factor evaluator for evaluating the calculated scale factors, wherein in the case where all scale factors deviate from an integer raster by a constant amount, a total scaling of the analysis time signal to the original time signal by a factor corresponding to the amount is established; and an assignor for assigning information to the analysis time signal concerning the scale factors used in quantizing the original time signal on which the analysis time signal is based.

8. Apparatus for encoding an analysis time signal comprising audio and/or video data that has been generated for encoding and decoding of an original time signal according to an encoding algorithm, wherein the encoding algorithm has a conversion step and a quantization step, wherein the conversion step serves to generate a spectral representation of the original time signal comprising original spectral coefficients by using an encoding block raster, wherein the quantization step for quantization serves to quantize at least part of the original spectral coefficients or spectral coefficients derived from the original spectral coefficients by using a quantization step width, wherein the quantization step of the encoding algorithm comprises grouping of the original spectral coefficients in scale factor bands, wherein a scale factor is associated to each scale factor band, and wherein the quantization step further comprises weighting the original spectral coefficients in a scale factor band with an encoding amplification factor, wherein the encoding amplification factor is in a predetermined relation to a scale factor for the scale factor band, comprising:

a block raster establisher for establishing the encoding block raster underlying the analysis time signal;

a converter for converting the analysis time signal into a spectral representation of the analysis time signal by using the established encoding block raster, wherein the spectral representation of the analysis time signal comprises analysis spectral coefficients;

a grouper for grouping the analysis spectral coefficients or the spectral coefficients derived from the analysis spectral coefficients in scale factor bands;

a greatest common divisor calculator for at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it; a scale factor calculator for calculating the scale factor for the scale factor band by evaluating the predetermined relation between the encoding amplification factor and the scale factor, wherein the calculated greatest common divisor is used in the predetermined relation instead of the encoding amplification factor;

a scale factor evaluator for evaluating the calculated scale factors, wherein in the case where all scale factors deviate from an integer raster by a constant amount, a total scaling of the analysis time signal to the original time signal by a factor corresponding to the amount is established; and a quantizer for quantizing the analysis spectral coefficients or the spectral coefficients derived from the analysis spectral coefficients by using the established scale factors to obtain an encoded analysis time signal.

9. Method for analyzing a spectral representation of an analysis signal comprising audio and/or video data that has been generated by encoding and decoding an original signal according to an encoding algorithm, wherein the encoding algorithm has a quantization step, wherein the quantization step serves to quantize at least part of the original spectral coefficients or spectral coefficients derived from the original spectral coefficients of the spectral representation of the original signal by using a quantization step width, wherein the quantization step of the encoding algorithm comprises grouping the original spectral coefficients into scale factor bands, wherein a scale factor is associated to each scale factor band, wherein the quantization step further comprises weighting the original spectral coefficients in a scale factor band with an encoding amplification factor, wherein the encoding amplification factor is in a predetermined relation to a scale factor for the scale factor band, comprising:

grouping of analysis spectral coefficients or spectral coefficients derived from the analysis spectral coefficients of the spectral representation of the analysis signals into scale factor bands;

at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it; and calculating the scale factor for the scale factor band by evaluating the predetermined relation between the encoding amplification factor and the scale factor, wherein the calculated greatest common divisor is used in the predetermined relation instead of the encoding amplification factor; and evaluating the calculated scale factors, wherein in the case where all scale factors deviate from an integer raster by a constant amount, a total scaling of the analysis time signal to the original time signal by a factor corresponding to the amount is established.

10. Method for marking an analysis time signal comprising audio and/or video data that has been generated by encoding and decoding an original time signal according to an encoding algorithm, wherein the encoding algorithm has a conversion step and a quantization step, wherein the conversion step serves to generate a spectral representation of the original time signal comprising original spectral coefficients by using an encoding block raster, wherein the quantization step serves to quantize at least part of the original spectral coefficients or the spectral coefficients derived from the original spectral coefficients by using a quantization step width, wherein the quantization step of the encoding algorithm comprises grouping of the original spectral coefficients into scale factor bands, wherein one scale factor is associated to each scale factor band, wherein the quantization step further comprises weighting the original spectral coefficients in a scale factor band with an encoding amplification factor, wherein the encoding amplification factor is in a predetermined relation to a scale factor for the scale factor band, comprising:

analyzing the analysis time signal with the following sub-steps;
  establishing the encoding block raster underlying the analysis time signals
  converting the analysis time signal into a spectral representation of the analysis time signal by using the established encoding block raster, wherein the spectral representation of the analysis time signal comprises analysis spectral coefficients;
  grouping of analysis spectral coefficients or spectral coefficients derived from the analysis spectral coefficients of the spectral representation of the analysis signal into scale factor bands;
  at least approximately calculating the highest common divisor of the grouped analysis spectral coefficients or the spectral coefficients derived from the analysis spectral coefficients in a scale factor band, to obtain the quantization step width used in the quantization step for the analysis spectral coefficients or the analysis spectral coefficients derived from the analysis spectral coefficients or an integer multiple of it;
  calculating the scale factor for the scale factor band by evaluating the predetermined relation between the encoding amplification factor and the scale factor, wherein the calculated greatest common divisor is used in the predetermined relation instead of the encoding amplification factor; and
  evaluating the calculated scale factors, wherein in the case where all scale factors deviate from an integer raster by a constant amount, a total scaling of the analysis time signal to the original time signal by a factor corresponding to the amount is established; and
assigning information to the analysis time signal concerning the scale factors used in quantizing the original time signal on which the analysis time signal is based.

11. Method for encoding an analysis time signal comprising audio and/or video data that has been generated by encoding and decoding an original time signal according to an encoding algorithm, wherein the encoding algorithm has a conversion step and a quantization step, wherein the conversion step serves to generate a spectral representation of the original time signal comprising original spectral coefficients by using an encoding block raster, wherein the quantization step serves to quantize at least part of the original spectral coefficients or the spectral coefficients derived from the original spectral coefficients by using a quantization step width, wherein the quantization step of the encoding algorithm comprises grouping the original spectral coefficients into scale factor bands, wherein one scale factor is associated to each scale factor band, wherein the quantization step further comprises weighting the original spectral coefficients in a scale factor band with an encoding amplification factor, wherein the encoding amplification factor is in a predetermined relation to a scale factor for the scale factor band, comprising:

establishing the encoding block raster underlying the analysis time signal;
converting the analysis time signal into a spectral representation of the analysis time signal by using the established encoding block raster, wherein the spectral representation of the analysis time signal comprises analysis spectral coefficients;
grouping of the analysis spectral coefficients or the spectral coefficients derived from the analysis spectral coefficients into scale factor bands;
at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it; and
calculating the scale factor for the scale factor band by evaluating the predetermined relation between the encoding amplification factor and the scale factor, wherein the calculated greatest common divisor is used in the predetermined relation instead of the encoding amplification factor;
evaluating the calculated scale factors, wherein in the case where all scale factors deviate from an integer raster by a constant amount, a total scaling of the analysis time signal to the original time signal by a factor corresponding to the amount is established; and
quantizing the analysis spectral coefficients or the spectral coefficients derived from the analysis spectral coefficients by using the predetermined scale factors to obtain an encoded analysis time signal.

12. Apparatus for analyzing a spectral representation of an analysis signal comprising audio and/or video data that has been generated by encoding and decoding an original signal according to an encoding algorithm, wherein the encoding algorithm has a quantization step, wherein the quantization step serves to quantize at least part of original spectral coefficients or spectral coefficients derived from the original spectral coefficients of a spectral representation of the original signal by using a quantization step width, wherein the quantization step of the encoding algorithm includes grouping of the original spectral coefficients into scale factor bands, wherein a scale factor is assigned to each scale factor band, and wherein the quantization step further comprises weighting the original spectral coefficients in a scale factor band with an encoding amplification factor, wherein the encoding amplification factor is in a predetermined relation to a scale factor for the scale factor band, comprising:

a grouper for grouping analysis spectral coefficients or spectral coefficients derived from the analysis spectral coefficients of the spectral representation of the analysis signal in scale factor bands;

a greatest common divisor calculator for at least approximately calculating the greatest common divisor of the grouped analysis spectral coefficients or the spectral coefficients derived from the analysis spectral coefficients in a scale factor band, to obtain the quantization step width used in the quantization step for the analysis spectral coefficients or for the analysis spectral coefficients derived from the analysis spectral coefficients or an integer multiple of it;

a scale factor calculator for calculating the scale factor for the scale factor band by evaluating the predetermined relation between the encoding amplification factor and the scale factor, wherein the calculated greatest common divisor is used in the predetermined relation instead of the encoding amplification factor; and a scale factor evaluator for evaluating calculated scale factors for each scale factor band, wherein in the case of a scale factor deviating from an integer raster the greatest common divisor underlying this scale factor is divided iteratively by a natural number greater or equal to two, to obtain a modified greatest common divisor, wherein the scale factor is calculated in each iteration step by using the modified greatest common divider, and wherein as many iteration steps are performed until all scale factors are present in an integer raster.

* * * * *